United States Patent
Wright et al.

(10) Patent No.: US 8,713,207 B2
(45) Date of Patent: *Apr. 29, 2014

(54) INSTRUMENTING CONFIGURATION AND SYSTEM SETTINGS

(71) Applicant: Microsoft Corporation, Redmond, WA (US)

(72) Inventors: Travis Wright, Everett, WA (US); Abbot Moffat, Redmond, WA (US); Hakan Berk, Redmond, WA (US); Ferit Findik, Sammamish, WA (US); Anand Lakshminarayanan, Redmond, WA (US); Shawn Bice, Sammamish, WA (US); Vitaly Voloshin, Issaquah, WA (US); Marisol Ontaneda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,440

(22) Filed: Feb. 25, 2013

(65) Prior Publication Data

US 2013/0246780 A1 Sep. 19, 2013

Related U.S. Application Data

(63) Continuation of application No. 11/691,997, filed on Mar. 27, 2007, now Pat. No. 8,386,653.

(51) Int. Cl.
*G06F 3/00* (2006.01)

(52) U.S. Cl.
USPC ............................................................ 710/8

(58) Field of Classification Search
None
See application file for complete search history.

(56) References Cited

U.S. PATENT DOCUMENTS

| | | |
|---|---|---|
| 6,587,876 B1 | 7/2003 | Mahon et al. |
| 6,671,695 B2 | 12/2003 | McFadden |
| 6,684,244 B1 | 1/2004 | Goldman et al. |
| 6,728,877 B2 | 4/2004 | Mackin et al. |
| 6,941,465 B1 | 9/2005 | Palekar et al. |
| 2002/0188627 A1 | 12/2002 | Bleizeffer et al. |
| 2003/0023587 A1* | 1/2003 | Dennis et al. ............... 707/3 |
| 2004/0073747 A1 | 4/2004 | Lu |
| 2004/0193953 A1 | 9/2004 | Callahan et al. |
| 2004/0215650 A1 | 10/2004 | Shaji et al. |
| 2005/0100211 A1 | 5/2005 | Gibson et al. |
| 2005/0144528 A1 | 6/2005 | Bucher et al. |
| 2005/0188116 A1 | 8/2005 | Brown et al. |
| 2005/0257244 A1 | 11/2005 | Joly et al. |
| 2005/0262076 A1 | 11/2005 | Voskuil |
| 2006/0074952 A1 | 4/2006 | Rothman et al. |
| 2006/0080667 A1 | 4/2006 | Sanghvi et al. |
| 2006/0212924 A1 | 9/2006 | Xie et al. |
| 2006/0224876 A1 | 10/2006 | Kato |
| 2006/0242690 A1 | 10/2006 | Wolf et al. |

(Continued)

OTHER PUBLICATIONS

Office Action for U.S. Appl. No. 11/691,997, mailed on Aug. 2, 2011, Travis Wright, "Instrumenting Configuration and System Settings" 12 pgs.

(Continued)

*Primary Examiner* — Kris Rhu
(74) *Attorney, Agent, or Firm* — Jim Sfekas; Kate Drakos; Micky Minhas

(57) ABSTRACT

Described are systems and methods for instrumenting configuration and system settings based on targeting configuration settings at dynamically populated groups, groups with varied membership, and objects defined in a class. The systems and methods provide for attributing a configuration setting or policy to one or more objects and then targeting the object at one or more scopes.

17 Claims, 7 Drawing Sheets

(56) References Cited

U.S. PATENT DOCUMENTS

2007/0189288 A1* 8/2007 Andrews et al. .............. 370/390
2007/0240151 A1 10/2007 Marl et al.
2008/0244258 A1 10/2008 Wright et al.

OTHER PUBLICATIONS

Office Action for U.S. Appl. No. 11/691,997, mailed on Dec. 8, 2011, Travis Wright, "Instrumenting Configuration and System Settings", 19 pgs.

Office action for U.S. Appl. No. 11/691,997, mailed on Aug. 1, 2012, Wright et al., "Instrumenting Configuration and System Settings", 24 pages.

Verma, et al., "Policy based Management of Content Distribution Networks", retrieved on available as early as Dec. 11, 2006, at <<http://www.cs.cmu.edu/~amiri/CDNPolicy.pdf>>, IEEE, pp. 1-7.

* cited by examiner

INSTRUMENTING CONFIGURATION AND SYSTEM SETTINGS

CROSS-REFERENCES TO RELATED APPLICATIONS

This application is a continuation of and claims priority to U.S. patent application Ser. No. 11/691,997, filed Mar. 27, 2007, the entire contents of which are incorporated herein by reference.

BACKGROUND

Most software and computer-based systems include associated configuration settings. The configuration settings determine how the software or the system will function. The software may be distributed to users with pre-defined default configuration settings which may not be universally applicable to all the users. In these situations, users may be required to modify these configuration settings.

Changing the configuration settings may be time consuming and error prone. In certain instances, users do not have enough information available to make appropriate changes to configuration settings. Furthermore, changing configuration settings incorrectly can often lead to system failure.

In certain cases, some software applications have complicated schemes to allow the user to change configuration settings. This may lead to the need for users to spend time and resources on training before they can use the software applications.

SUMMARY

This summary is provided to introduce concepts relating to instrumenting configuration and system settings which are further described below in the detailed description. This summary is not intended to identify essential features of the claimed subject matter, nor is it intended for use in determining the scope of the claimed subject matter.

In an embodiment, configuration settings are monitored, conflicting policies are resolved, configuration settings are updated. Furthermore, notifications may be received as to conflict of settings which identify the settings that are subject of the conflict.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for instrumenting configuration settings are described which are based on targeting configuration settings at a target scope. The system will automatically resolve conflicts between configuration settings where possible. When the conflicts cannot be resolved automatically, the system additionally provides mechanisms for informing a user, for example a system administrator.

To implement this, a system includes one or more computer programs or agents that can identify configuration settings to be targeted to the desired scope. The agent also resolves a conflict arising due to the allocation of different configuration settings to objects that are member to one or more scopes. Conflict resolution is achieved by realizing one or more resolving logics that can be implemented by associating a resolving logic with types of configuration settings. Configuration settings can also be implemented in groups. The agent groups similar configuration settings on the basis of associated meta-data.

While aspects of described systems and methods for instrumenting configuration and system settings can be implemented in any number of different computing systems, environments, and/or configurations, embodiments of system analysis and management are described in the context of the following exemplary system architecture(s).

An Exemplary System

Figure 1:
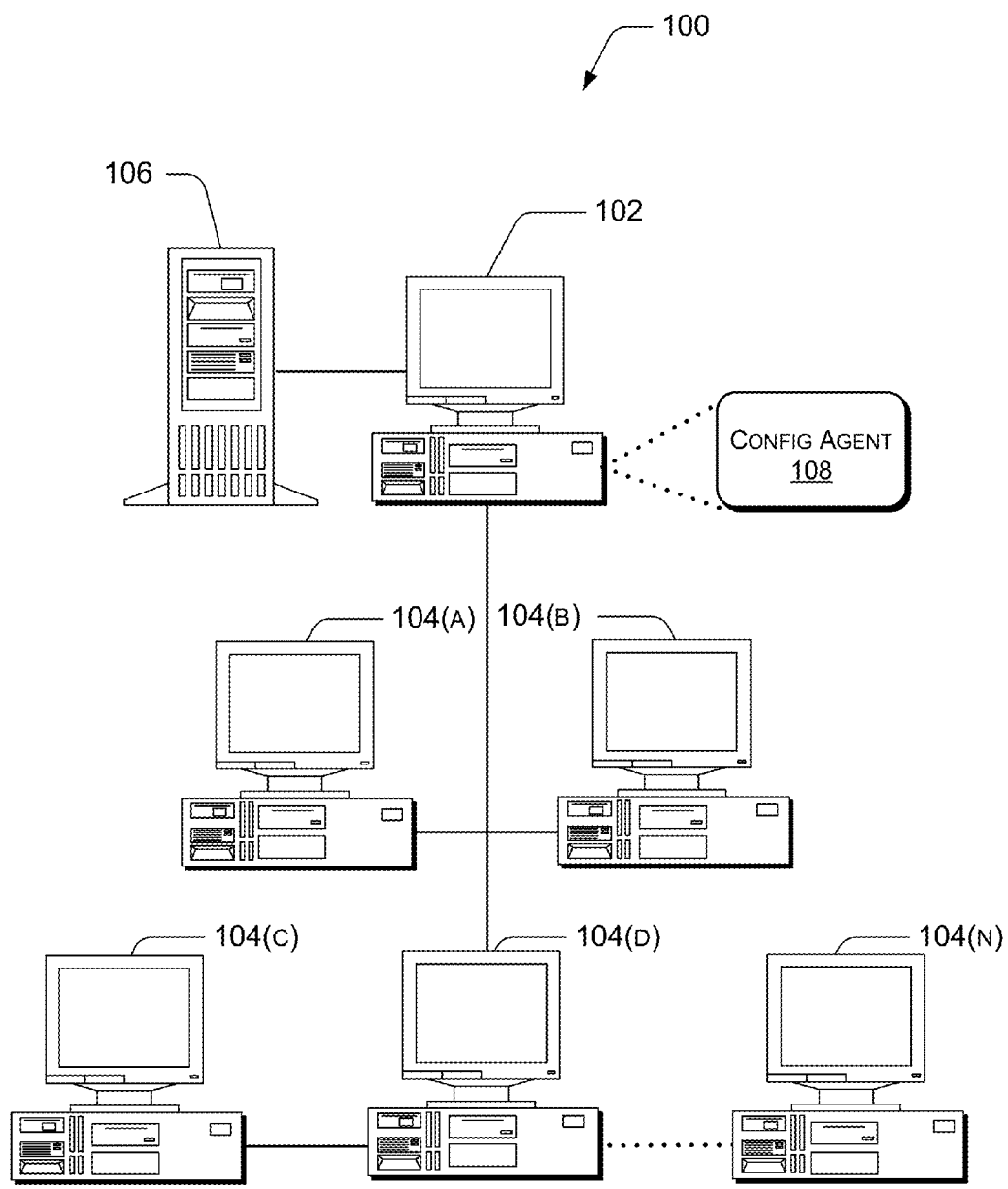
FIG. 1 illustrates an exemplary architecture for instrumenting configuration and system settings.

FIG. 1 illustrates an exemplary computer system 100 in which configuration settings or policies can be instrumented. Computer system 100 includes a central computing-based device server 102, other computing-based devices 104(A)-(N), and a database server 106. Central computing-based device 102, computing-based devices 104(A)-(N), and database server 106 can include personal computers (PCs), web servers, email servers, home entertainment devices, game consoles, set top boxes, and any other computing-based device known in the art.

Furthermore, computer system 100 can include any number of computing-based devices 104(A)-(N). For example, in one implementation, computer system 100 can be a company network, including thousands of office PCs, various servers, and other computing-based devices spread throughout several countries. Alternately, system 100 can include a home network with a limited number of PCs belonging to a single family.

Computing-based devices 104(A)-(N) can be coupled to each other in various combinations through a wired and/or wireless network, including a LAN, WAN, or any other networking technology known in the art.

Central computing-based device 102 can also include configuration agent 108. Configuration agent 108 is capable of instrumenting configuration settings, resolving conflicts arising due to allotting of conflicting configuration settings and appending the configuration settings to the existing default configuration settings making it more extensible. The manner in which the above are implemented by configuration agent 108 will be discussed further below.

It will be understood, that configuration agent 108 can be included on any combination of computing-based devices 102, 104(A)-(N), 106. For example, in one implementation, one of the computing-based devices 104(A)-(N) in computing system 100 can include configuration agent 108. Alternately, in another possible implementation, several selected computing-based devices 102, 104(A)-(N), 106 can include configuration agent 108.

As discussed above, configuration agent 108 identifies the data associated with a configuration setting. Based on the data, configuration agent 108 can group the configuration setting with similar configuration settings. In certain cases, the similarly grouped configuration settings can be stored in database server 106 for future analysis and comparison. For example, in one implementation configuration settings that are found to be similar to previously determined similar configuration settings, can be transmitted to another device, such as database server 106 for retention, processing and/or further analysis. It will also be understood that database server 106 can also be coupled to one or more of computing-based devices 104(A)-(N). Moreover, one or more database servers 106 may exist in system 100, with any combination of computing-based devices 102, 104 (A)-(N) being coupled to the one or more collection servers 106. Computing-based devices 102, 104(A)-(N) may be coupled to one or more database servers 106 through other computing-based devices 102, 104 (A)-(N).

Figure 2:
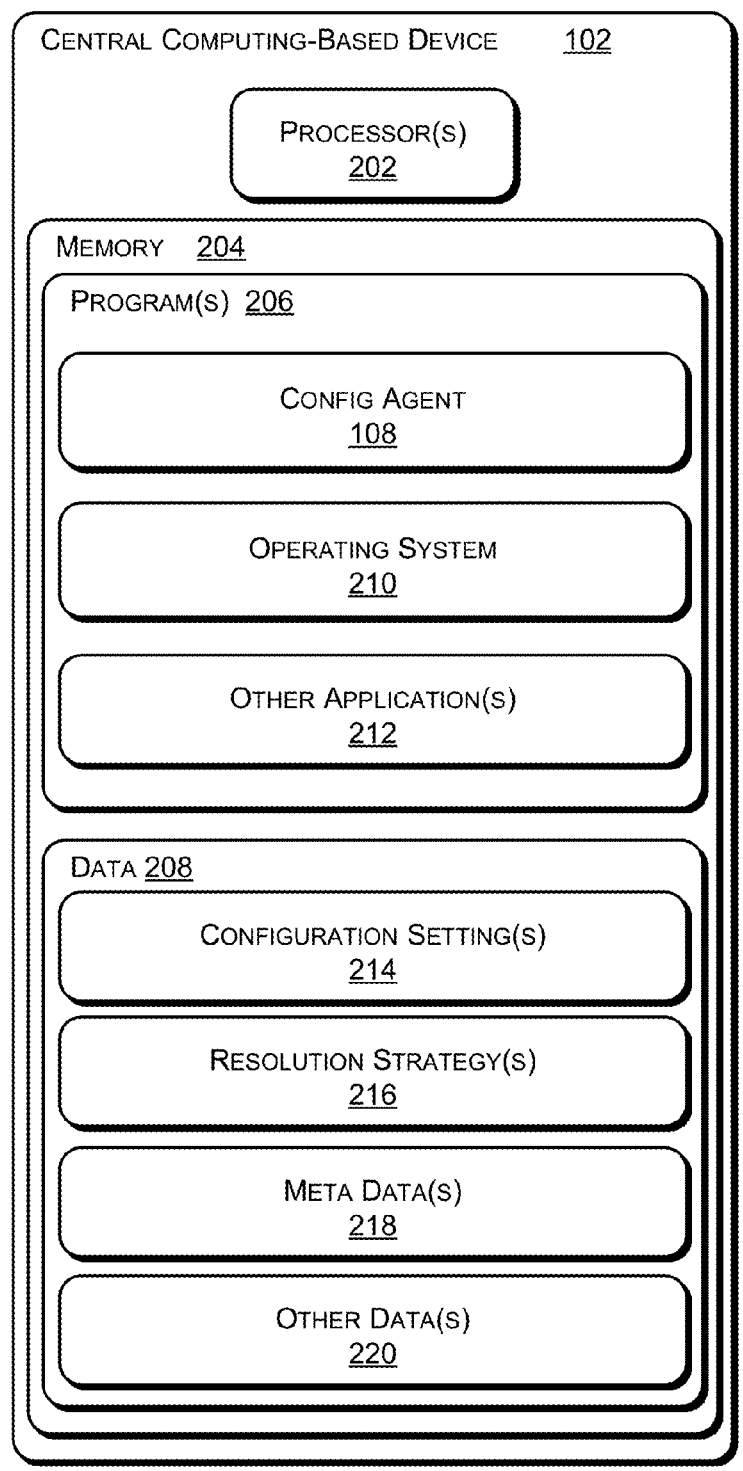
FIG. 2 illustrates an exemplary central computing-based device.

FIG. 2 illustrates relevant exemplary components of central computing-based device 102. Central computing-based device 102 may include one or more processor(s) 202, and a memory 204. Processor(s) 202 include, for example, microprocessors, microcomputers, microcontrollers, digital signal processors, central processing units, state machines, logic circuitries, and/or any devices that manipulate signals based on operational instructions. Among other capabilities, processor(s) 202 are configured to fetch and execute computer-readable instructions stored in memory 204.

Memory 204 can include any computer-readable medium known in the art, such as volatile memory (e.g., RAM) and/or non-volatile memory (e.g., flash, etc.). As illustrated in FIG. 2, memory 204 also can include program(s) 206 and data 208. Program(s) 206 include, for example, configuration agent 108, an operating system 210, and other application(s) 212. Other application(s) 212 include programs that supplement applications on any computing based device such as word processor applications, spreadsheet applications, etc. Data 208 include, for example, configurations setting(s) 214, resolution strategy(s) 216, meta data(s) 218, other data(s) 220 and so on. All data related to and/or other information associated with configuration settings is stored in configuration setting(s) 214. It is to be appreciated that references to configurations settings may imply references to data in configuration setting(s) 214. Other data(s) 220 include data that is related to and generated in response to the general functioning of one or more program modules and/or other application(s) 212.

Figure 3:
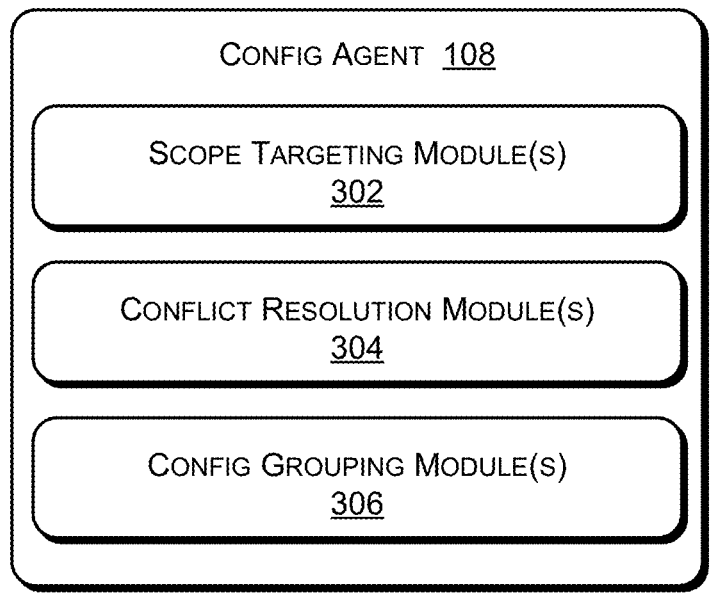
FIG. 3 illustrates an exemplary configuration agent.

FIG. 3 illustrates relevant exemplary components of configuration agent 108. Configuration agent 108 further includes scope targeting module(s) 302, conflict resolution module(s) 304 and configuration grouping module(s) 306. A more elaborate description for the working of configuration agent 108 would be discussed in following sections titled "Scope Targeting", "Conflict Resolution" and "Configuration Settings Grouping".

Scope Targeting

"Scope targeting" refers to targeting of one or more customizable configuration settings at one or more scopes. "Scope" can be understood as the collection of managed objects in a computer network in which the effect of the applied configuration setting manifests itself. For example, configuration setting(s) 214 that changes the appearance of the cursor can be applied to a single computer or it could be applied to a group of computers. For example, a system administrator, can implement configuration setting(s) 214 that would eventually be applicable to all members of the network. Other examples of various "scopes" include, but are not limited to, site, domain, etc.

Scope targeting is implemented through scope targeting module(s) 302 in configuration agent 108. Scope targeting module(s) 302 creates a policy set which is a collection of configuration setting(s) 214. The customized settings are associated with one or more appropriate scopes by a user, such as a system administrator. The association between the configuration setting(s) 214 and the targets provides a correlation or a context. Such context allows avoiding redundant scope targeting. For example, attributes like free memory space, associated with a configurations setting should not be associated with configuration settings related to a processor. Such contextual association reduces the complexity of applying changes to configuration settings when required.

The scope can be defined to a level that extends below the architectural hierarchy of a computing based device, such as any one or more of the computing-based device(s) 102, 104 (A)-(N). For example, scope can be defined for entities like disk drives, and similar hardware components of one or more of the computing-based device(s) 102, 104(A)-(N). Scope can also extend above the architectural hierarchy of a computing based device, such as any one or more of the computing-based device(s) 102, 104(A)-(N). For example, scope can be defined for entities like domains, sites, services, or groups of computers. Scope can also be defined as logical entities such as software applications, logical network connections, databases, or operating systems. Scope can thus be defined so as to increase the fineness or granularity to which a given configuration setting can be applied. In certain implementations, the scope can be customized through a user interface.

Configuration agent 108 can target a class of managed objects. A class of objects includes entities that are characterized by similar attributes. For example, scope targeting module(s) 302 can target a class of all disk drives that may be functioning on one or more of the computing-based device(s) 102, 104(A)-(N). In such cases, the targeted disk drives are instances of a class with the individual disk drives being the managed objects. Scope targeting module(s) 302 can also dynamically discover individual managed objects of the class being targeted. The discovered objects can be prompted to a user through a user interface. In certain implementations, a user can also define a group, which includes one or more managed objects, and target the group. Changes to configuration setting targeted at the group would result in the change in the configuration setting(s) 214 of its members. Objects included in the defined group may or may not be characterized by similar attributes. For example, a user may define as a group a number of databases as well as a number of network devices and an application.

Configuration settings targeted at a given scope are inherited to scopes contained by that scope. For example, Scope targeting module(s) 302 when targeting the group could also apply the relevant settings to all the contained managed objects and other contained groups. When configuration settings are targeted at managed objects like servers which contain other managed objects such as the databases hosted on the server, those settings will be inherited for each of the databases contained by that server. When configuration settings are targeted at a class they are inherited by those classes which derive from the targeted class.

Various groups can also be defined so as to increase the flexibility with which the settings can be applied. Such groups can be defined on the basis of one or more attributes of the targets on which the configuration settings are applied. For example, scope targeting module(s) 302 can automatically populate a group on the basis of a particular manufacturer a group of objects (i.e., a disk drive class). In another possible implementation, configuration agent 108 can dynamically manage and control the number of members in the group. For example, scope targeting module(s) 302 can dynamically add managed objects to a group as new drives are added to one or more of the computing-based device(s) 102, 104(A)-(N) which match the criteria for inclusion in the group. A group can be a collection of specific managed objects as well as all managed objects which match group inclusion criteria.

Conflict Resolution

A conflict arises when overlap occurs as to the scope to which the relevant configuration settings are applied. For example, a given computer can be a member of a site, a domain, and one or more organizational units. When different settings are applied to the different scopes, conflicting configuration settings may be targeted to the same computer. In this case, a given computer with two different and conflicting configuration settings must resolve the conflict.

Configuration agent 108 can determine if any conflicts exist and take action accordingly. Configuration agent 108 can also define resolution strategies for resolving the conflict. Errors arising due to installation of conflicting configuration settings is managed and addressed by conflict resolution module(s) 304 in configuration agent 108. Conflict that arises due to the implementation of conflicting settings may generate an error or a notification. Conflict resolution module(s) 304 identifies from the notification, configuration setting(s) 214 and related scopes that may be responsible for the generation of the notification. In an implementation, conflict resolution module(s) 304 identifies relevant conflicting configuration setting(s) 214 by examining the scope to which it has been applied.

Conflict resolution module(s) 304 may seek to identify possible resolution strategies from resolution strategy(s) 216. Resolution strategy(s) 216 include possible strategies for resolving a conflict that may arise in association with a setting. Resolution strategy(s) 216 may include one or more rules that define the manner in which one of the conflicting configuration settings is handled.

The selected setting that is handled can be a setting that ultimately prevails over the other conflicting configuration settings. The selected settings can also be settings that are rejected in the event of a conflict. The decision whether one or more of the conflicting configuration settings is accepted or rejected may be made on the basis of rules that define the resolution strategy(s) 216. For example, resolution strategy(s) 216 may include rules that allow the first created configuration settings to be applied. Other example of such rules defining the resolution strategy(s) 216 include but are not limited to, last created prevails, last modified prevails, etc. Furthermore, conflict resolution module(s) 304 can randomly select a resolving strategy from resolution strategy(s) 216.

Conflict resolution module(s) 304 while identifying the appropriate resolution strategy(s) 216 determines the specificity of the applied configurations settings. A rule can be defined that requires that more specific settings be given a higher priority. For example, settings that are targeted to a specific managed object scope are more specific than settings that are targeted to a group scope. Further, settings which are targeted to a group scope are more specific than settings that are targeted to a class scope. A first group which is a subset of a second group can also be defined to be more specific as compared to the second group. A first class which is derived from a second class can also be defined to be more specific as compared to the second class.

Conflict resolution module(s) 304 while identifying the appropriate resolution strategy(s) 216 determines the most restrictive resulting configuration setting given the type of configuration setting. For example if a configuration setting targeted at one scope specified a range of 10-30 and another configuration setting targeted at an overlapping scope specified a range of 20-25 the conflict resolution module(s) 304 would apply the more restrictive range of 20-25. Similar most restrictive strategies can be applied for Boolean configuration settings, numbers, enumerations, etc. Logic for dealing with conflict resolution can be codified in the configuration settings schema which the conflict resolution module(s) 304 can use to resolve conflicts.

Possible strategies for resolving conflicts may be stored in a database either internally or externally. Possible strategies for conflict resolution that are associated with one or more configuration settings can be represented in the form of a schema. In an implementation, schema generated can be stored in other data(s) 220.

Configuration Settings Grouping

The volume of settings that may be present in one or more of the computing-based devices 104(A)-(N) can be extremely large. In addition, new settings may be added by third party vendors, making the task of identifying the appropriate settings cumbersome. Grouping similar settings can reduce the amount of settings that are made available for a resource onto which the settings are applied. Grouping of similar settings can provide a user (e.g., an administrator), the ability to modify the available settings and also allow third party vendors to present their own settings for specific programs.

To implement this, information associated with the new settings are evaluated. If the information is similar to the corresponding information associated with existing settings, a match is declared. The new settings are then grouped together with similar settings.

Grouping module(s) 306 in configuration agent 108 can monitor one or more settings to determine similar or like settings. On the presentation of a new setting, grouping module(s) 306 identifies the setting that is to be defined. The settings are identified on the basis of information that is associated with a setting. The settings can be, for example, meta data(s) 218 that is associated with the setting in consideration. New settings can be stored in configuration setting(s) 214.

Meta data(s) 218 associated with configuration setting(s) 214 may be indicative of the attributes of a setting in consideration. Examples of meta data include category of the setting, level of importance of a setting, read/write permissions, etc.

Grouping module(s) 306 can also identify the meta data(s) 218 associated with one or more of the already available settings. Grouping module(s) 306 then compares the meta data(s) 218 associated with the new and the available settings. Based on the comparison, grouping module(s) 306 determines the types of settings to which the new setting is similar. On identification, similar settings are grouped together. In one implementation, the comparison performed between the meta data(s) 218 associated with settings can be absolute or partial. For example, an absolute comparison may have the meta data compared to be exactly same. On the other hand, a partial match may have only some portions of the meta data to be same. For example, a comparison may only seek to find settings corresponding to a given category.

A user (e.g., system administrator) can be presented with the grouped settings enabling the user to choose the appropriate setting from a list of pertinent settings. The settings presented may be pertinent to context with which the system administrator wants to install the setting.

Exemplary Method(s)

Exemplary methods for instrumenting configuration and system settings are described with reference to FIGS. 1, 2, and 3. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices linked through a communications network. In a distributed computing environment, computer executable instructions may be located in both local and remote computer storage media, including memory storage devices.

Figure 4:
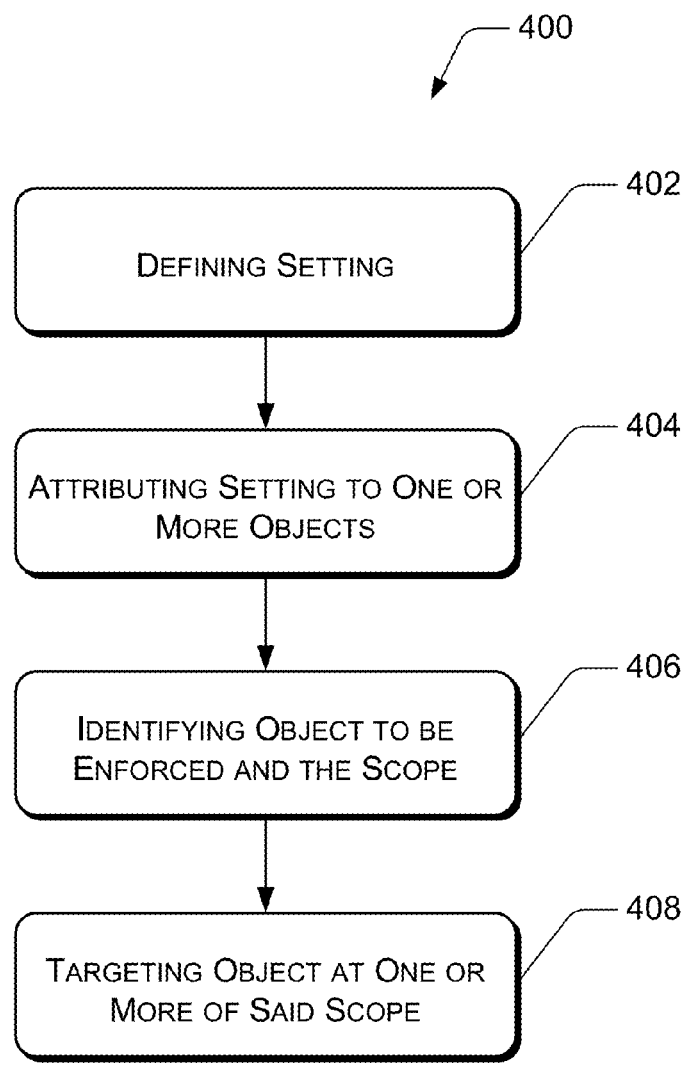
FIG. 4 illustrates an exemplary method(s) for associating policies to a scope.

FIG. 4 illustrates an exemplary method 400 for targeting a scope with desired settings on a computing-based device, for example, any one or more of the computing-based devices 104(A)-(N).

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, the settings that are to be applied are defined. For example, configuration agent 108 or more specifically scope targeting module(s) 302 defines settings that are to be applied. The settings that are defined are to be later targeted on to the desired scopes.

At block 404, the settings that are to be applied are attributed to one or more objects. For example, scope targeting module(s) 302 associates the settings that have to be applied to one or more managed objects. The managed objects in consideration can include one or more configuration settings. A managed object can also include settings defined in configuration setting(s) 214. The customized configuration settings are associated with one or more appropriate targets thereby providing a correlation or a context. Such correlation or context can allow avoiding redundant scope targeting. For example, attributes like display properties, associated with a configurations setting may not be associated with configuration settings related to a hardware device like a mouse. Such contextual association reduces the complexity of changing configuration settings.

At block 406, the object and the associated settings that are to be applied and the scope or target to which the settings are to be applied, are identified. For example, scope targeting module(s) 302 identifies the object and the scope on to which the object has to be targeted on. As discussed, scope can be understood as the hierarchical level in a computer network in which the effect of the applied configuration setting manifests itself. An example of various scopes or targets include organizational unit.

At block 408, the object that includes the collection of settings is applied to the desired or selected scope. For example, scope targeting module(s) 302 targets the selected scope with the identified object. In this manner, all configuration settings that are defined within the object are applied as to the scope.

A class of managed objects characterized by similar attribute types can also be targeted. For example, scope targeting module(s) 302 can target a class of all hard disk drives that may be operating on one or more of the computing-based device(s) 102, 104(A)-(N). In such cases, all hard drives are part of a class with the individual hard drive being the managed objects.

Figure 5:
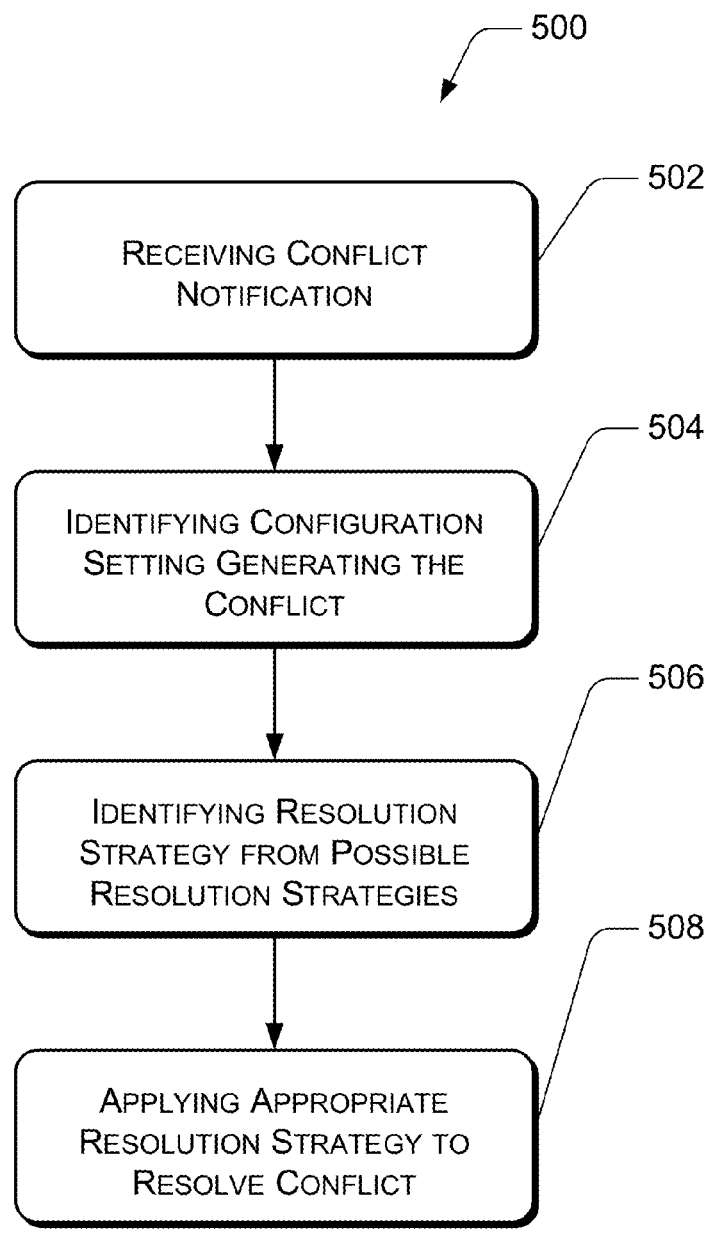
FIG. 5 illustrates an exemplary method(s) for resolving conflict arising due to association of different policies to overlapping scopes.

FIG. 5 illustrates an exemplary method 500 for resolving a conflict arising due to installation of conflicting settings on a computing-based device, for example in any one or more of the computing-based devices 104(A)-(N).

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, a notification indicating a conflict of installed settings is received. For example, conflict resolution module(s) 304 discovers and informs a user (e.g., system administrator) of any instances that may be occurring as a result of conflicting settings. A conflict arises when the scope to which the relevant settings are to be applied overlap. Different configuration settings being applied to the different scopes result in conflicting configuration settings getting installed on the same machine. In this case, a given machine with the conflicting configuration settings would generate an error.

At block 504, the settings that are the subject of the generated conflict are identified. For example, conflict resolution module(s) 304 monitors the generated conflict notification to determine which settings are involved in the conflict. Conflict resolution module(s) 304 can also determine the origin of the conflict by examining the scope onto which the settings were applied.

At block 506, resolution strategies are identified in order to resolve the generated conflict. For example, conflict resolution module(s) 304 determines the resolution strategy from a list of possible strategies that are available in resolution strategy(s) 216. Resolution strategy(s) 216 can include all possible strategies for resolving a conflict that may arise in association with a configuration setting.

Resolution strategy(s) 216 can also include one or more rules that define the manner in which one of the conflicting configuration settings are handled. Conflict resolution module(s) 304 while identifying the appropriate resolution strategy(s) 216 can determine the specificity of the applied configurations settings. Settings which are more specific can override the settings that are less specific. The resolution strategy(s) 216 can be maintained in the form of a schema. The schema includes the possible resolution strategies for the respective settings.

At block 508, the identified resolution strategy is applied so as to resolve the conflict arising due to conflicting settings. For example, conflict resolution module(s) 304 applies the identified strategy from resolution strategy(s) 216 to resolve the conflict.

Figure 6:
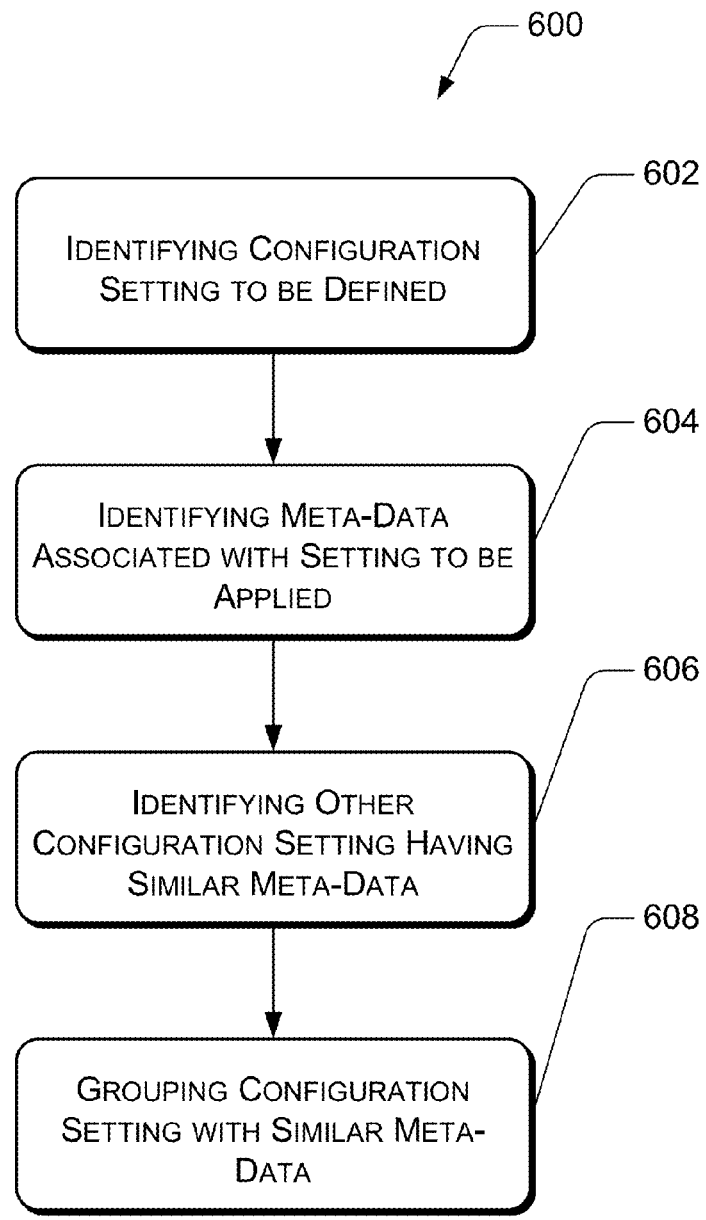
FIG. 6 illustrates an exemplary method(s) for accommodating extensible configuration setting.

FIG. 6 illustrates an exemplary method 600 for resolving a conflict arising due to installation of conflicting settings in any one or more of the computing-based devices 104(A)-(N).

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602, settings that are to be defined are identified. For example, grouping module(s) 306 identifies the new settings. The new settings may be put forth by third party vendors to supplement the already available settings for programs on one or more of the computing-based devices 104(A)-(N).

At block 604, meta data associated with the new setting is identified. For example, grouping module(s) 306 identifies the meta data associated with one or more of the new settings. Meta data associated with configuration setting(s) 214 is indicative of the attributes of a setting in consideration. Examples of meta data include category of the setting, level of importance of a setting, read/write permissions, etc.

At block 606, settings having similar meta data as compared to the new settings are determined. For example, grouping module(s) 306 determines the meta data associated with other settings available on one or more of the computing-based devices 104(A)-(N). Grouping module(s) 306 then compares the meta data corresponding to the new and the available settings. In one implementation, the comparison performed between the meta data associated with settings can be absolute or partial.

At block 608, based on the above indicated comparison, settings having same or similar meta data are grouped together. For example, grouping module(s) 306 on comparison evaluate all settings that have same or similar meta data. Setting characterized by same or similar meta data are then grouped together. In this manner, new settings can be added to the set of available settings. In one implementation, the settings with similar meta data can be presented to user wanting to implement a setting change, through a user interface.

Exemplary Computer Environment

Figure 7:
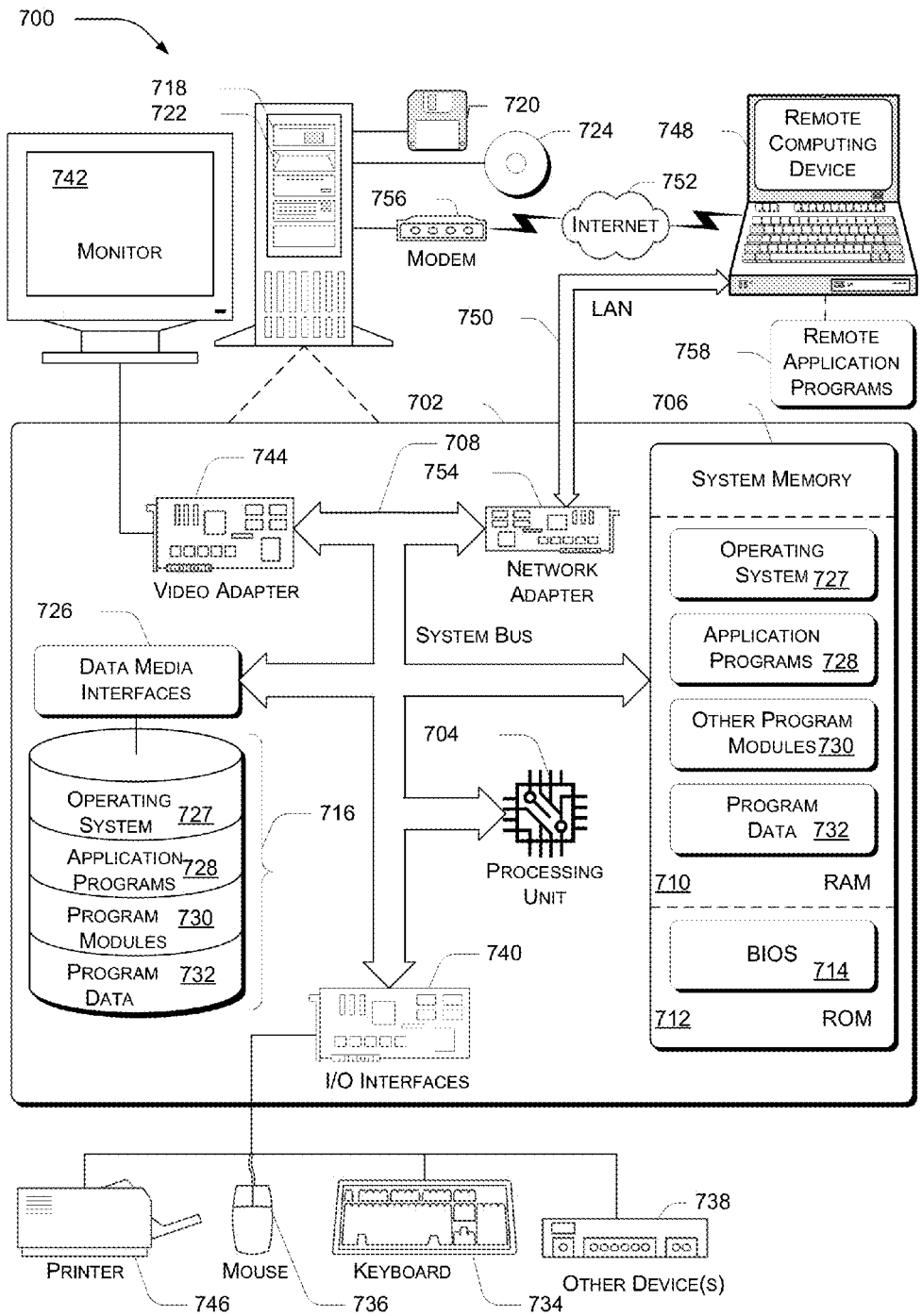
FIG. 7 illustrates an exemplary computing environment.

FIG. 7 illustrates an exemplary general computer environment 700, which can be used to implement the techniques described herein, and which may be representative, in whole or in part, of elements described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing-based device in the form of a computer 702. Computer 702 can be, for example, a desktop computer, a handheld computer, a notebook or laptop computer, a server computer, a game console, and so on. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternately, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 727, one or more application programs 728, other program modules 730, and program data 732. Each of such operating system 727, one or more application programs 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing-based device 748. By way of example, the remote computing-based device 748 can be a personal computer, portable computer, a server, a router, a network computer, a peer device or other common network node, and the like. The remote computing-based device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components reside at various times in different storage components of the computing-based device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

Although embodiments for implementing configuration and system settings have been described in language specific to structural features and/or methods, it is to be understood that the subject of the appended claims is not necessarily limited to the specific features or methods described. Rather, the specific features and methods are disclosed as exemplary implementations for implementing configuration and system settings.

What is claimed is:

1. One or more computer readable storage devices storing executable instructions, that, when executed by one or more processors, cause the one or more processors to perform acts comprising:
   receiving a notification indicating a conflict between first and second installed configuration settings;
   determining a cause of the conflict by:
      analyzing a scope to which the first installed configuration setting is applied and a scope to which the second installed configuration setting is applied; and
      based at least in part on the analysis, determining that one or more classes of objects associated with the first installed configuration setting overlaps with one or more classes of objects associated with the second installed configuration setting; and
   causing the conflict to be resolved through one or more resolution strategies based at least in part on the cause of the conflict.

2. The one or more computer readable storage devices of claim 1, wherein the conflict is resolved based at least in part on when the first and second installed configuration settings were applied or modified.

3. The one or more computer readable storage devices of claim 1, wherein the conflict is resolved based at least in part on a breadth of the scope of the first installed configuration setting relative to a breadth of the scope of the second installed configuration setting.

4. The one or more computer readable storage devices of claim 1, wherein the first and second installed configuration settings configure the function of software, hardware, or both software and hardware.

5. The one or more computer readable storage devices of claim 1, wherein one or both of the first and second installed configuration settings comprise a customizable configuration setting.

6. The one or more computer readable storage devices of claim 1, wherein at least one of the scope of the first installed configuration setting or the scope of the second installed configuration setting is specified by a user.

7. A method comprising:
   under control of one or more computing systems:
   receiving a notification indicating a conflict between first and second installed configuration settings;
   determining a cause of the conflict by determining that one or more classes of objects associated with the first installed configuration setting overlaps with one or more classes of objects associated with the second installed configuration setting; and
   causing the conflict to be resolved through one or more resolution strategies based at least in part on the cause of the conflict.

8. The method of claim 7, wherein the conflict is resolved based at least in part on when the first and second installed configuration settings were applied or modified.

9. The method of claim 7, wherein the conflict is resolved based at least in part on a breadth of a scope of the first installed configuration setting relative to a breadth of a scope of the second installed configuration setting.

10. The method of claim 7, wherein the first and second installed configuration settings configure the function of software, hardware, or both software and hardware.

11. The method of claim 7, wherein one or both of the first and second installed configuration settings comprise a customizable configuration setting.

12. The method of claim 7, wherein at least one of a scope to which the first installed configuration setting is applied or a scope to which the second installed configuration setting is applied is specified by a user.

13. A system comprising:
one or more processors;
memory communicatively coupled to the one or more processors; and
a conflict resolution module at least partially stored in the memory and at least partially executable by the one or more processors to:
identify a conflict between first and second installed configuration settings;
determine a cause of the conflict by analyzing a scope to which the first installed configuration setting is applied and a scope to which the second installed configuration setting is applied, the analysis identifying that at least one class of objects is within the scope to which the first installed configuration setting is applied and is within the scope to which the second installed configuration setting is applied; and
identify a resolution strategy to resolve the conflict based at least in part on the cause of the conflict.

14. The system of claim 13, wherein the resolution strategy indicates that the conflict is to be resolved based at least in part on when the first and second installed configuration settings were applied.

15. The system of claim 13, wherein the resolution strategy indicates that the conflict is to be resolved based at least in part on when the first and second installed configuration settings were last modified.

16. The system of claim 13, wherein the resolution strategy indicates that the conflict is to be resolved based on at least one of a breadth of the scope of the first installed configuration setting or a breadth of the scope of the second installed configuration setting.

17. The system of claim 13, wherein at least one of the scope of the first installed configuration setting or the scope of the second installed configuration settings is specified by a user.

* * * * *